United States Patent [19]
Patterson

[11] Patent Number: 5,676,816
[45] Date of Patent: Oct. 14, 1997

[54] CATALYTIC PARTICLES ELECTROLYTIC CELL SYSTEM AND METHOD FOR PRODUCING HEAT

[76] Inventor: James A. Patterson, 2074 20th St., Sarasota, Fla. 34234

[21] Appl. No.: 680,916

[22] Filed: Jul. 12, 1996

[51] Int. Cl.$^6$ .............................. C25B 1/00; C25B 9/00; C25B 11/06; C25B 15/08
[52] U.S. Cl. ..................... 205/334; 204/241; 204/275; 204/284; 204/190 K; 502/326
[58] Field of Search ................................ 204/241, 275, 204/284; 205/334; 502/326

[56] References Cited

U.S. PATENT DOCUMENTS

| | | | |
|---|---|---|---|
| 4,269,689 | 5/1981 | Agladze et al. | 204/222 X |
| 4,316,786 | 2/1982 | Yu et al. | 204/275 X |
| 4,536,488 | 8/1985 | Wanke et al. | 502/159 |
| 4,920,088 | 4/1990 | Kolts | 502/326 |

Primary Examiner—Donald R. Valentine
Attorney, Agent, or Firm—Charles J. Prescott

[57] ABSTRACT

Catalytic particles, electrolytic cell and system for producing heat in a water-based liquid electrolyte. The catalytic particles are formed of clay doped with an active gent capable of becoming a proton carrier in the presence of hydrogen or an isotope of hydrogen, preferably lithium chloride, and temperature cured into a ceramic core. The active agent is taken from the groups now known to exhibit this proton carrier characteristic and include sulfonated or carbonated salts of alkali metal earths and resin based sulfonate salts or sulfonic acid. The ceramic cores are uniformly coated with a layer of one or more metals of a group of metals, each of which is highly capable of combining with hydrogen or an isotope of hydrogen to form a metal hydride or deuteride. The electrolytic cell of the system includes a non-conductive housing structured for liquid electrolyte flow therethrough and includes a bed of the catalytic particles held within the housing between spaced conductive grids. An electric power source in the system is operably connected to the grids so that, when the cell is filled with the liquid electrolyte either flowing through the cell or with no external flow of electrolyte, electrical current flows between the grids to initially charge the particle bed and to thereafter support the production of excess heat for use.

15 Claims, 2 Drawing Sheets

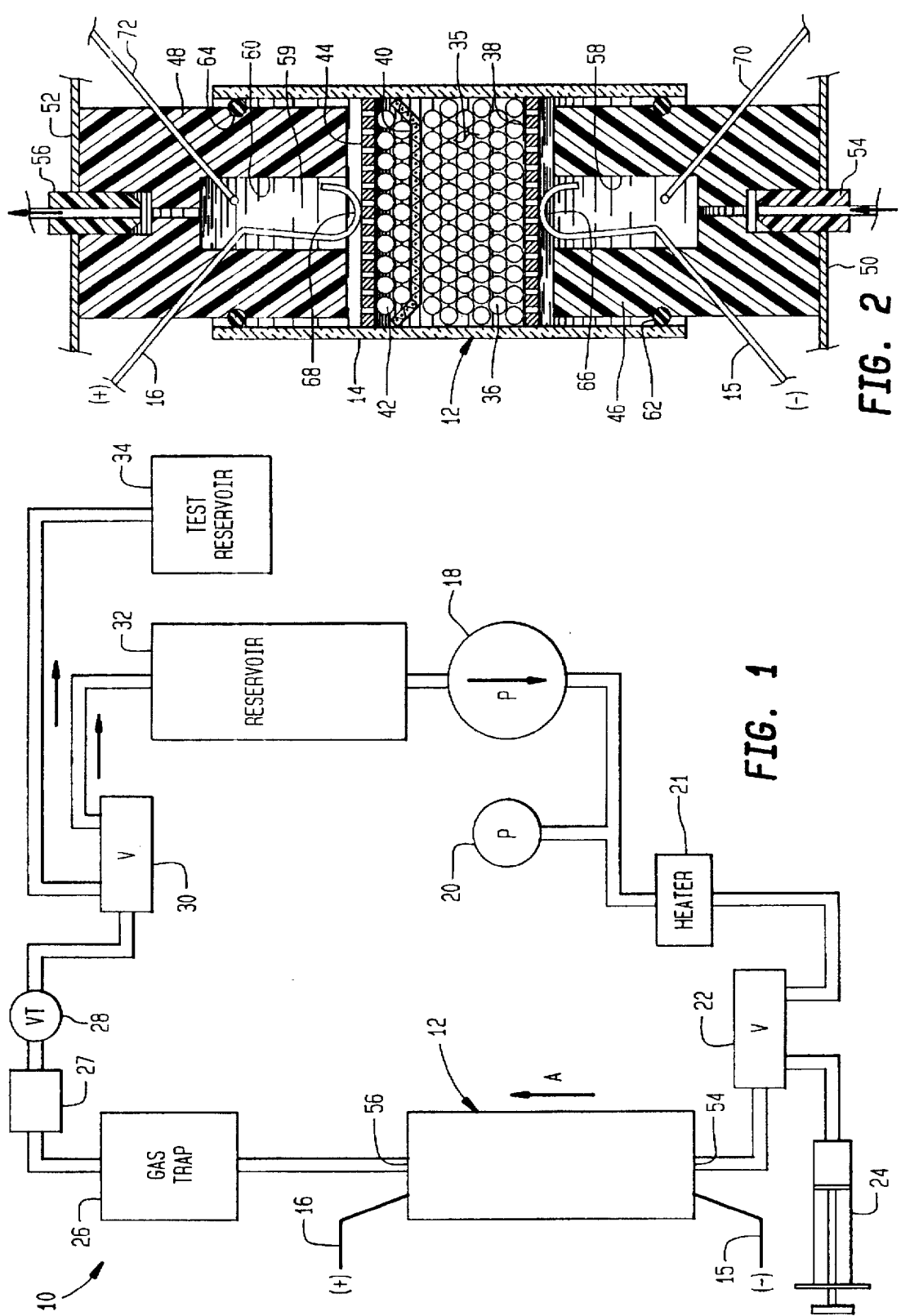

1

CATALYTIC PARTICLES ELECTROLYTIC CELL SYSTEM AND METHOD FOR PRODUCING HEAT

BACKGROUND OF THE INVENTION

1. Scope of Invention

This invention relates generally to electrolytic cells, and more particularly to an improved electrolytic cell and catalytic particles therefor and system for the electrolysis of a liquid electrolyte to produce useful excess heat.

2. Prior Art

The utilization of palladium coated microspheres or beads as a catalytic agent for the absorption of hydrogen is taught in prior U.S. Pat. Nos. 4,943,355 ('355) and 5,036,031 ('031). In these patents, the utilization of cross linked polymer microspheres forming an inner core and having a coating of palladium thereatop exhibit significant improvements in the level of hydrogen absorption and the absorption of isotopes of hydrogen.

Utilizing these catalytic microspheres led to the invention disclosed in U.S. Pat. Nos. 5,318,675 ('675) and 5,372,688 ('688) which teach an electrolytic cell, system and method for, inter alia, producing heat within a liquid electrolyte.

More recently, U.S. Pat. No. 5,494,559 ('559) discloses an improvement in the layer structure of the catalytic microspheres or beads within the electrolytic cell. The combination of nickel/palladium layers enhance the production of excess heat within the liquid electrolyte.

In each of these prior '675, '688 and '559 U.S. patents, the electrolytic cell described therein included an inlet and an outlet facilitating the flow of the liquid electrolyte therethrough. Thus, as the liquid electrolyte is passed through the electrolytic cell, it is acted upon catalytically by the particular bed of catalytic particles contained within the housing of the electrolytic cell to produce excess heat for use by conventional means for converting, or directly using, heat energy derived from the heated liquid electrolyte.

The present invention improves upon the structure and composition of the catalytic particles which make up the active particle bed within the electrolytic cell through the utilization of clay which is doped with an active agent, preferably lithium chloride, or one of other sulfonated or carbonated salts of alkali metal earths or a resin based sulfonate or sulfonic acid to form ceramic cores. Various active metallic hydride forming layers atop the ceramic cores are also provided.

BRIEF SUMMARY OF THE INVENTION

This invention is directed to catalytic particles, electrolytic cell, system and method for producing excess heat for external use in conjunction with a water-based liquid electrolyte. The catalytic particles are each formed of clay doped with an active agent capable of becoming a proton carrier in the presence of hydrogen or an isotope of hydrogen, preferably lithium chloride, and temperature cured into a ceramic core. The active agent is taken from groups now known to exhibit this proton carrier characteristic and include sulfonated or carbonated salts of alkali metal earths, resin based sulfonate salts, and resin based sulfonic acid. The ceramic cores are uniformly coated with a layer of one or more metals of a group of metals, each of which is highly capable of combining with hydrogen or an isotope of hydrogen to form a metal hydride or deuteride. The electrolytic cell of the system includes a non-conductive housing structured for liquid electrolyte flow therethrough and includes a bed of the ceramic catalytic particles held within the housing between spaced conductive grids. An electric power source in the system is operably connected to the grids so that, when the cell is filled with the liquid electrolyte, electrical current flows between the grids to initially charge the particle bed and to thereafter support the production of excess heat within the liquid electrolyte. An external electrolyte heater may be used to increase the inlet operating temperature of the electrolyte to substantially increase the differential temperature ($\Delta T$) while passing through the cell.

BRIEF DESCRIPTION OF THE DRAWINGS

FIG. 1 is a schematic view of a system and electrolytic cell embodying the present invention.

FIG. 2 is a section view of the electrolytic cell shown in FIG. 1.

DETAILED DESCRIPTION OF THE INVENTION

Figure 3:
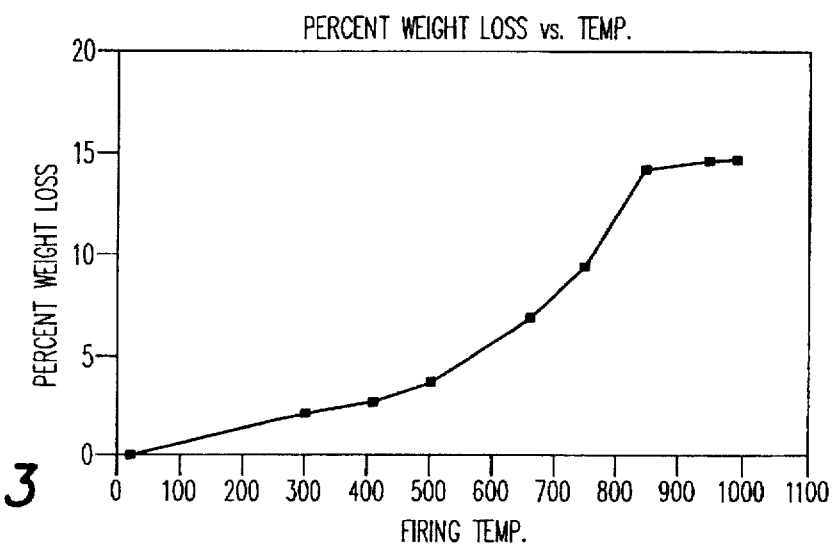
FIG. 3 is a graph showing the relationship between curing temperature and percentage weight loss of the clay.

Referring now to the drawings, and particularly to FIG. 1, a system embodying concepts of the invention is shown generally at numeral 10. This system 10 includes an electrolytic cell shown generally at numeral 12 interconnected at each end thereof with a closed loop electrolyte circulation system. The circulation system includes a constant volume pump 18 which draws a liquid electrolyte 59 from a reservoir 32 and forces the electrolyte 59 in the direction of the arrow into inlet 54 of electrolytic cell 12. After the electrolytic cell 12 is filled with the electrolyte 59, the fluid then exits an outlet 56, thereafter flowing into a gas trap 26 which is provided to separate and recombine hydrogen and oxygen gas from the electrolyte 59 as required. A throttle valve 28 downstream of the gas trap 26 regulates the electrolyte flow so as to also regulate the fluid pressure within the electrolytic cell 12 as monitored by pressure gauge 20. Excess heat generated within the cell 12 may be utilized in conventional means at 27, such as by heat exchange or by direct use of a heated liquid.

A slide valve 22 provides for the intermittent introduction of ingredients into the liquid electrolyte 59 via syringe 24. A second slide valve 30 provides for the periodic removal of electrolyte 59 into test reservoir 34 for analysis to determine correct electrolyte make-up.

Also shown in FIG. 1 is an in-line heater 21 disposed between the pressure gauge 20 and the slide valve 22. This heater 21 is provided to heat the electrolyte liquid 59 as it flows through the system 10 and the cell 12. Note importantly that the heater 21 may be positioned anywhere in the closed system electrolyte flow path, although positioning of the heater 21 is preferred to be adjacent the inlet 54 of the cell 12 for better liquid electrolyte inlet temperature control.

The heating of the electrolyte external to the cell 12 and prior to entry into the cell 12 is one means for triggering and enhancing the catalytic reaction within the cell 12 to produce a higher positive temperature differential ($\Delta T$) of the electrolyte as it flows through the cell 12. Another means preferred for triggering this heat production reaction between the electrolyte 59 and a bed 35 of conductive particles 36 within the cell 12 is by the application of sufficient electric d.c. current across electrodes 15 and 16 as described herebelow.

In FIG. 2, the details of the electrolytic cell 12 is there shown. A cylindrical glass non-conductive housing 14, open at each end, includes a moveable non-conductive end member 46 and 48 at each end thereof. These end members 46 and 48 are sealed within the housing 14 by O-rings 62 and 64. The relative spacing between these end members 46 and 48 is controlled by the movement of end plates 50 and 52 thereagainst.

Each of the end members 46 and 48 includes an inlet stopper 54 and an outlet stopper 56, respectively. Each of these stoppers 54 and 56 define an inlet and an outlet passage, respectively into and out of the interior volume, respectively, of the electrolytic cell 12. These end members 46 and 48 also include a fluid chamber 58 and 60, respectively within which are mounted electrodes 15 and 16, respectively, which extend from these chambers 58 and 60 to the exterior of the electrolytic cell 12 for interconnection to a constant current-type d.c. power supply (not shown) having its negative and positive terminals connected as shown. Also positioned within the chambers 58 and 60 are thermocouples 70 and 72 for monitoring the electrolyte temperature at these points of inlet and outlet of the electrolytic cell 12. However, in the experiments reported herebelow, the inlet temperature of the liquid electrolyte was measured just outside of the cell 12 immediately upstream of stopper 54 to more accurately reflect true temperature differential ($\Delta T$) of the liquid electrolyte 59 while passing through the cell 12.

A plurality of separate, packed conductive beads or particles 36 are positioned to define a particle bed 35 within housing 14 immediately adjacent and against a conductive foraminous or porous grid 38 formed of platinum and positioned transversely across the housing 14 as shown. These conductive particles 36 each include a cured ceramic core which has been doped and uniformly blended within the uncured clay with an active agent before being dried and temperature cured into ceramic, the alkali metal earth salt, lithium chloride, being preferred as the active agent. However, all alkali salts which are highly soluble in water are included in the group of active agents, namely sulfonated and carbonated salts of lithium, sodium, potassium, rubidium and cesium. The general requirement of the active agent is that it be capable of becoming a proton carrier in the presence of hydrogen or an isotope of hydrogen. The group of active agents thus also includes resin based sulfonated salts and sulfonic acid as follows:

$RSO_3Li$
$RSO_3H$
$RSO_3K$
$RSO_3Na$
$RSO_3Ru$
$RSO_3Ce$

The preferred resin is polystyrene divinyl benzene which is burned away during final curing of the ceramic cores.

The size and shape of these conductive particles is now known to be of lesser significance so that variations in particle shape, including an irregular shape and size, are within the scope of this invention, although a spherical bead shape is preferred. Moreover, size or shape consistency is now known not to be a required limitation. Further details of these ceramic particles 36 and method of production is described herebelow.

Still referring to FIG. 2, a non-conducive foraminous nylon mesh 40 is positioned against the other end of these conductive particles 36 so as to retain them in the position shown. Adjacent the opposite surface of this non-conductive mesh 40 is a plurality of non-conductive spherical beads, or more generally particles, 42 formed of cross-linked polystyrene and having a uniform diameter of about 1.0 mm. Against the other surface of this layer of non-conductive spheres 42 is a conductive foraminous or porous grid 44 positioned transversely across the housing 14 as shown.

Should the system 10 boil off or otherwise inadvertently lose all liquid electrolyte within the cell 12, a means of preventing system shut-down is preferred which replaces the non-conductive beads 42 with non-metallic spherical cation ion exchange polymer conductive beads preferably made of cross-linked styrene divinyl benzene having fully pre-sulfonated surfaces which have been ion exchanged with a lithium salt. This preferred non-metallic conductive bead structure will thus form a "salt bridge" between the anode 44 and the conductive particles 36, the non-conductive mesh 40 having apertures sufficiently large to permit contact between the conductive particles 36 and the conductive non-metallic beads. The mesh size of mesh 40 is in the range of 200–500 micrometers. This preferred embodiment also prevents melting of the sulfonated non-conductive beads 42 while reducing cell resistance during high loading and normal operation.

The end of the electrode 15 is in electrical contact at 66 with conductive grid 38, while electrode 16 is in electrical contact at 68 with conductive grid 44 as shown. By this arrangement, when there is no electrolyte within the electrolytic cell 12, no current will flow between the electrodes 15 and 16.

ELECTROLYTE

When the electrolytic cell 12 is filled with a liquid electrolyte 59, electric current will flow between the electrodes 15 and 16. The preferred formulation for this electrolyte 59 is generally that of a conductive salt in solution with water. The preferred embodiment of water is that of either light water ($H_2^1O$) or heavy water and, preferably deuterium ($H_2^2O$). The purity of all of the electrolyte components is of utmost importance. The water ($H_2^1O$) and the deuterium ($H_2^2O$) must have a minimum resistance of one megohm with a turbidity of less than 0.2 n.t.u. This turbidity is controlled by ultra membrane filtration. The preferred salt solution is lithium sulfate ($Li_2SO_4$) in a 1-molar mixture with water and is of chemically pure quality. In general, although a lithium sulfate is preferred, other conductive salts chosen from the group containing boron, aluminum, gallium, and thallium, as well as lithium, may be utilized. The preferred pH or acidity of the electrolyte is 9.0.

CONDUCTIVE CERAMIC PARTICLES

Palladium coated microspheres were originally preferred as disclosed in U.S. Pat. Nos. '675 and '688 and as taught in U.S. Pat. Nos. '355 and '031. The '599 patent teaches a combination of nickel/palladium layers for enhanced heat output. Moreover, palladium may be substituted by other transition metals, rare earths and also uranium. In general, any of these metals which are capable of combining with high volumes of hydrogen to form "metallic hydrides" are acceptable. These metals known to applicant which will serve as a substitute for palladium are lanthanum, praseodymium, cerium, titanium, zirconium, vanadium, tantalum, uranium, hafnium and thorium. Authority for the inclusion of these elements within this group is found in a book entitled "*Inorganic Hydrides*, by B. L. Shaw, published by Pergammon Press, 1967. However, palladium is the best known and most widely studied metallic hydride.

Other recent research by R. Mills in an article entitled *Excess Heat Production by the Electrolysis of Inequious Potassium Carbonate Electrolyte and the Implications for "Cold Fusion"* published in Fusion Technology 20 dated (1991) 65, suggests that nickel should be added to this category of metallic hydride or deuteride forming metals for production of heat using an $H_2O$-based electrolyte.

In an even more general sense, the broad requirement here is to provide a metallic hydride or deuteride forming metal in the presence of hydrogen, the exact shape and consistency in size being a secondary consideration so long as one of the conductive metals hereinabove described is used as a catalyst.

The primary structural element used to form the inner cores of the conductive particles 36 are small clay cylinders which have been uniformly loaded or doped with the active agent, preferably lithium chloride salt in a broad range of volume-to-volume ratios of clay to active agent in the range of up to about 10:1 or 10%. The uncured clay may be conventional red or white clay such as that available from Poly-Crafts, Inc., Sarasota, Fla. Particle sizes are in the range of 0.1–0.3 μm having a density of 2–6 $g/in^3$ and a specific surface area of 25–35 $m^2/g$.

PREPARATION OF PARTICLES

Lithium chloride as the preferred active agent and moist clay (approximately 16.7% moisture) were uniformly blended together. The blended clay was then extruded into a mold formed by drilling uniform 1/16" holes through a flat plate having a thickness of approximately 1/16". After the clay is forced into or extruded into the holes, an infrared lamp was applied for approximately twenty minutes to remove pour water obtaining a 5–8% percentage. Thereafter, these dried clay cylinders having a diameter of approximately 0.061" and a length of approximately 0.64" were removed from the mold. Because corners easily chipped, each of these cores were ball milled to round corners. The corners were then heated at approximately 550° C. for approximately 3 hours to remove matrix water and to partially cure the clay into a ceramic. The total volume of each particle was approximately 4.5 ml.

The partially cured ceramic cylinders are then placed in a ball milled with a 2× volume of 2.0 mm steel shot and 10× volume of water and ball milled until the desired spherical shape is obtained. The preferred nominal diameter of the spheres obtained and utilized in the testing reported herebelow was approximately 1.0 mm diameter.

After ball milling into the desired size and shape, the particles were dried and then primed by laying down a flash coat of metal. This was done by placing the cores in a 0.025 molar $Pd\ Cl_2$ aqueous solution at 55° C. for fifteen minutes, after which the particles were drained and placed in a 0.5 hydrogen solution to set the palladium in the ceramic. The surface palladium was reduced by adding 2–3 drops of 15% hydrazine solution to the hydrogen solution.

A layer of palladium 1.0 micron thick was then deposited by electroless plating techniques taught in previously referenced patents. The particles were then coated by electroless plating with approximately 1 micron layer of nickel using standard nickel coating Solutions EN PON A and EN PON B from Technic, Inc., Engineered-Powder Division, Woonsocket, R.I. The nickel outer layer is preferred, but not required.

POROSITY

Referring to FIG. 3, a study of the available porosity within the cured clay into ceramic as a function of firing or cure temperature in ° C. is there depicted. Generally, with increasing firing temperature, the weight loss steadily increases to indicate greater amounts of porosity as a result of more complete moisture removal and curing. This indication of porosity would appear to reflect the ability of the loaded ceramic particles to increase surface contact with the liquid electrolyte within the cell and to increase heat production.

Figure 4:
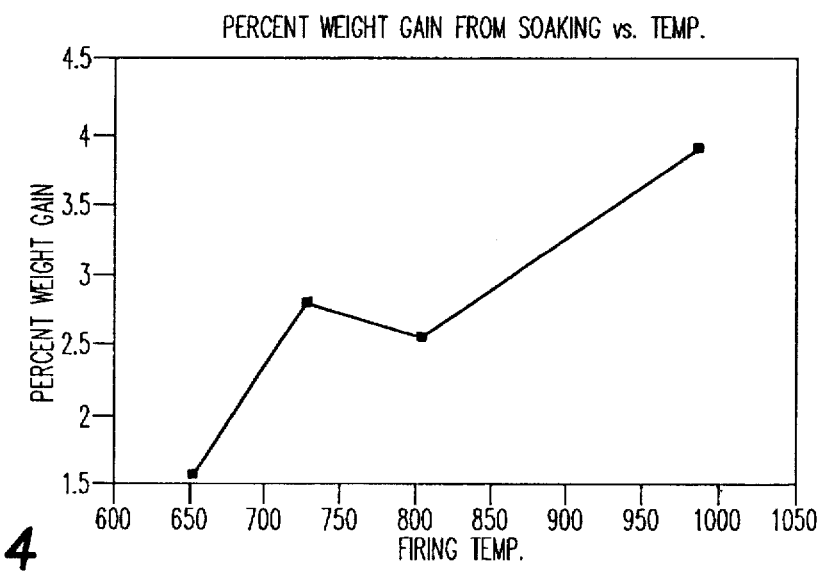
FIG. 4 is a graph generally showing a typical cell charging curve.

FIG. 4 graphically displays the cured ceramic particle water uptake also as a function of curing or firing temperature in ° C. Ceramic particles were cured at the data points indicated and then soaked in water and thereafter weighed for percentage of weight gain also as an indication of porosity of the cured ceramic particles.

CELL RESISTANCE

In preparing the electrolytic cells for testing, the cell resistance utilizing a Whetstone Bridge or ohm meter was utilized prior to the introduction of the electrolyte into the electrolytic cell. This cell resistance, when dry, should be infinitely high. Otherwise, a short between the anode screen and the cathode beads exists and the unit would have to be repacked. When testing with electrolyte present at 0.02 amps, the resistance should be in the range of 100 to 200 ohms per sq. cm of cross section area as measured transverse to the direction of current flow.

RELATIVE SURFACE AREAS

The range in diameters of the conductive particles as above described is relatively broad, limited primarily by the ability to plate the cores and the economic factors involved therein. As a guideline however, it has been determined that there exists a preferred range in the ratio between the total surface area of all of the conductive particles collectively within the electrolytic cell and the inner surface area of the non-conductive housing which surrounds the bed of conductive particles.

A minimum preferred ratio of the total bead surface area to the inner housing surface area is in the range of 5 to 1 (5:1). However, an ideal area ratio is 10 to 1 (10:1) and is typically utilized in the experiments reported herebelow. This ratio is thus affected primarily by the size of the conductive particles, the smaller the diameter, the higher the ratio becomes.

EXPERIMENTAL RESULTS

The testing procedures incorporated two stages. The first stage may be viewed as a loading stage during which a relatively low level current (0.05 amps) is introduced across the conductive members, that current facilitated by the presence of the electrolyte as previously described.

LOADING

Figure 5:
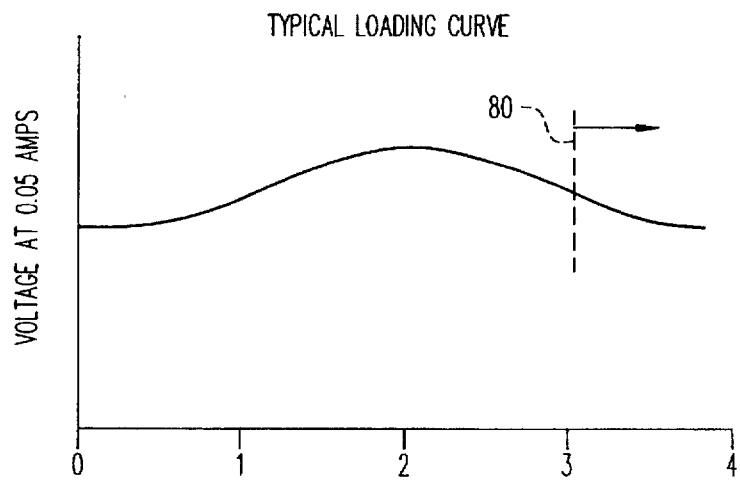
FIG. 5 is a graph of a typical cell loading curve.

During the initial loading, electrolysis of the water within the liquid electrolyte occurs so that the hydrogen active surface of the conductive particles fully absorbs and combines with hydrogen, i.e. becomes "loaded". This loading takes about two hours under a current flow through the cell of about 0.05 amps per two (2) $cm^3$ of particle volume. As the particles load with hydrogen, the resistance of the cell will be seen to increase. The cell's resistance measured at constant temperature should be seen to raise about 10%. It is recommended that the loading should proceed at least until the resistance is no longer increasing. As loading proceeds further, a decrease in resistance will appear. FIG. 5 is a general depiction of a typical cell loading curve. Preferably the cell should be run after the loading has proceeded to at least the region beginning at numeral 80.

TEST RUN

After hydrogen and/or hydrogen isotope, loading of the hydrogen active material of the conductive particles, the current level between conductive members is then incrementally increased, during which time the electrolyte temperature differential is monitored. The temperature of the electrolyte 59 circulating through the electrolytic cell 12 and system 10 was fully monitored, along with temperature differential between thermocouples 70 and 72 and flow rate of the liquid electrolyte 59. Preferably, and more accurately, in lieu of placing the thermocouple 70 as shown in FIG. 2, the electrolyte inlet temperature was monitored immediately upstream of stopper 54 to more accurately reflect temperature differential ($\Delta T$).

In general, all tabular results herebelow represent data taken on a steady state basis, input and output temperatures of the liquid electrolyte 59 being taken upstream of stopper 54 and at 72, respectively, voltage (v) and current flow (a) across the electrolytic cell 12 measured between terminals or conductors 15 and 16. The flow rate of the liquid electrolyte 59 (ml/min) and calculated wattage input and wattage output and percent yield are also shown. Percent yield is defined and calculated as the wattage output divided by the wattage input times 100 percent. With respect to input voltage, a reduction of 1.5 volts was made for loss in electrolyzing $H_2O$ within the liquid electrolyte due to recombination.

Note in these test results that, after 58 minutes of operation of the cell following the charging procedure outlined hereinabove, additional external heat was added from heater 21 in FIG. 1 to raise the operating temperature of the electrolyte 59. This electrolyte temperature increase significantly increased percentage yield of heat output.

TABLE I

| | | | | | | | | | |
|---|---|---|---|---|---|---|---|---|---|
| | | Nickel Outer Layer | | | | | | | |
| Time (min) | $\Delta T$°C. (To-Tin) | T(in)°C. | Amps (A) | Volts (V) | V-1.5 | Flow Rate ml/min | Watts in | Watts out | % Yield |
| 0 | 0.9 | 21.3 | 0.02 | 2.75 | 1.25 | 17.6 | .025 | 1.10 | 4414. |
| 4 | 1.0 | 21.1 | 0.02 | 3.17 | 1.67 | 17.6 | .030 | 1.23 | 4087. |
| 20 | 1.5 | 21.0 | 0.02 | 3.18 | 1.68 | 17.6 | .030 | 1.84 | 6131. |
| 42 | 1.7 | 21.2 | 0.02 | 3.25 | 1.75 | 17.6 | .035 | 2.08 | 5956. |
| 52 | 1.5 | 21.4 | 0.02 | 3.24 | 1.74 | 17.6 | .030 | 1.84 | 6131. |
| 58 | 1.3 | 21.4 | 0.02 | 3.20 | 1.70 | 17.6 | .030 | 1.59 | 5313. |
| HEAT ADDED | | | | | | | | | |
| 68 | 9.9 | 32.1 | 0.02 | 3.04 | 1.54 | 17;6 | .030 | 12.13 | 40462. |
| 84 | 12.0 | 34.8 | 0.02 | 2.98 | 1.48 | 17.6 | .029 | 14.71 | 50737. |
| 96 | 13.0 | 37.3 | 0.02 | 2.96 | 1.46 | 17.6 | .029 | 15.93 | 54965. |

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A system for producing useful excess heat in a liquid electrolyte while within an electrolytic cell comprising:

said electrolytic cell including a non-conductive housing and an inlet and an outlet;

a first conductive grid positioned within said housing adjacent to said inlet;

a second conductive grid positioned within said housing spaced from said first conductive grid and adjacent to said outlet;

a plurality of conductive beads or particles each having a ceramic core doped with an active agent before curing and a conductive metallic hydride forming layer atop said ceramic core which will combine with hydrogen or an isotope of hydrogen to form a metallic hydride, said conductive beads in electrical communication with said first conductive grid and electrically isolated from said second grid;

said active agent becoming a proton carrier when in the presence of hydrogen or an isotope of hydrogen;

means for pumping said liquid electrolyte into said electrolytic cell through said inlet, said electrolyte having a conductive salt in solution with water;

an electric power source operably connected to said first and second grids.

2. A system as set forth in claim 1, wherein each said conductive bead includes:

a conductive metal flash coating of uniform thickness formed atop said ceramic core by chemical combination with a cation exchange surface of said ceramic core from a metal cation which will chemically reduce with hydrazine;

a nickel layer of uniform thickness formed atop said metallic hydride forming layer.

3. A system as set forth in claim 2, wherein:

said metallic hydride forming layer is taken from the group consisting of:

palladium, lanthanum, praseodymium, cerium, titanium, zirconium, vanadium, tantalum, uranium, hafnium and thorium.

4. A system as set forth in claim 2, wherein;

said flash coating is taken from the group consisting of: copper, palladium, nickel and titanium;

said metallic hydride forming layer is taken from the group consisting of:

palladium, lanthanum, praseodymium, cerium, titanium, zirconium, vanadium, tantalum, uranium, hafnium and thorium.

5. A system as set forth in claim 1, further comprising:

a plurality of non-metallic beads each having a sulfonated surface which has been ion exchanged with a lithium salt;

said plurality of non-metallic beads positioned between said second grid and said conductive beads;

said plurality of non-metallic beads forming a conductive salt bridge thereacross.

6. A system as set forth in claim 1, further comprising:
   means for heating said liquid electrolyte external to said electrolytic cell.

7. An electrolytic cell comprising:
   a non-conductive housing and an inlet and an outlet;
   a first conductive grid positioned within said housing adjacent to said inlet;
   a second conductive grid positioned within said housing spaced from said first conductive grid and adjacent to said outlet;
   a plurality of conductive beads or particles each having a ceramic core doped with an active agent before curing and a conductive metallic hydride forming layer atop said ceramic core which will combine with hydrogen or an isotope of hydrogen to form a metallic hydride, said conductive beads in electrical communication with said first conductive grid and electrically isolated from said second grid;
   said active agent becoming a proton carrier when in the presence of hydrogen or an isotope of hydrogen.

8. A system as set forth in claim 7, wherein each said conductive bead includes:
   a conductive metal flash coating of uniform thickness formed atop said ceramic core by chemical combination with a cation exchange surface of said ceramic core from a metal cation which will chemically reduce with hydrazine;
   a nickel layer of uniform thickness formed atop said metallic hydride forming layer.

9. A system as set forth in claim 8, wherein:
   said metallic hydride forming layer is taken from the group consisting of: palladium, lanthanum, praseodymium, cerium, titanium, zirconium, vanadium, tantalum, uranium, hafnium and thorium.

10. A system as set forth in claim 8, wherein:
    said flash coating is taken from the group consisting of: copper, palladium, nickel and titanium;
    said metallic hydride forming layer is taken from the group consisting of:
    palladium, lanthanum, praseodymium, cerium, titanium, zirconium, vanadium, tantalum, uranium, hafnium and thorium.

11. A method of producing excess heat within a liquid electrolyte for use of the heat elsewhere comprising the steps of:
    A. providing an electrolytic cell including:
       a non-conductive housing and an inlet and an outlet;
       a first conductive grid positioned within said housing adjacent to said inlet;
       a second conductive grid positioned within said housing spaced from said first conductive grid and adjacent to said outlet;
       a plurality of conductive beads or particles each having a ceramic core doped with an active agent before curing and a conductive metallic hydride forming layer atop said ceramic core which will combine with hydrogen or an isotope of hydrogen to form a metallic hydride, said plurality of conductive beads in electrical communication with said first conductive grid and electrically isolated from said second grid, said active agent becoming a proton carrier when in the presence of hydrogen or an isotope of hydrogen;
       an electric power source operably connected to said first and second grids;
    B. circulating said electrolyte through said electrolytic cell;
    C. passing said electrical current between said first and second grids when said electrolyte is circulating within said electrolytic cell;
    D. removing heat from said electrolyte for use after said electrolyte exits said electrolytic cell through said outlet.

12. A method as set forth in claim 11, wherein:
    said metallic surface is taken from the group consisting of:
    palladium, lanthanum, praseodymium, cerium, titanium, zirconium, vanadium, tantalum, uranium, hafnium, and thorium.

13. A method as set forth in claim 11, wherein each said conductive bead includes:
    a conductive metal flash coating of uniform thickness formed by chemical combination with a cation exchange surface of a spherical cross-linked polymer microbead from a metal cation which will chemically reduce with hydrazine;
    a nickel layer of uniform thickness formed atop said flash coating.

14. A method as set forth in claim 11, further comprising the step after step B of:
    E. heating said electrolyte external to said electrolytic cell to a preselected temperature.

15. A palladium plated catalyst having high hydrogen adsorption capabilities comprising:
    a conductive bead having a ceramic core doped with an active agent before curing and layers thereatop of palladium, then a nickel layer atop said palladium layer, each said layer of uniform thickness;
    said active agent becoming a proton carrier when in the presence of hydrogen or an isotope of hydrogen;
    said palladium layer combining with hydrogen or an isotope of hydrogen to form a metallic hydride.

* * * * *